Oct. 4, 1955   E. B. GARDNER   2,719,567
APPARATUS FOR HEAT SEALING
Filed Nov. 16, 1949   2 Sheets-Sheet 1

INVENTOR
EDWARD BOYD GARDNER
BY Parham + Bates
ATTORNEYS

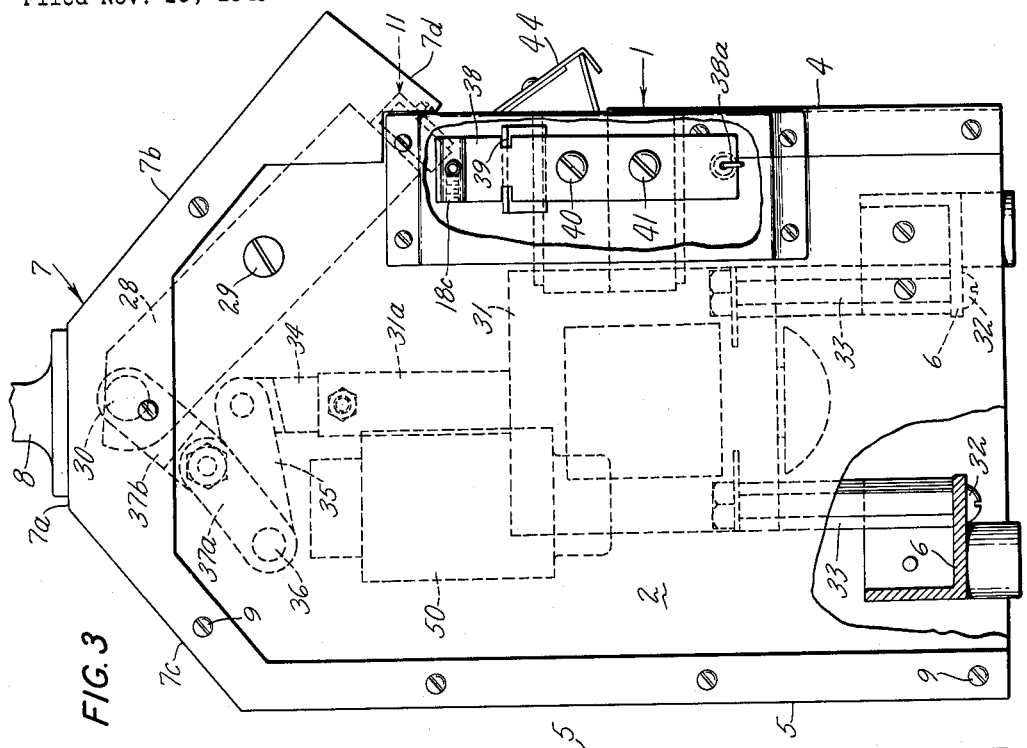

United States Patent Office 2,719,567
Patented Oct. 4, 1955

2,719,567

APPARATUS FOR HEAT SEALING

Edward Boyd Gardner, Williston Park, N. Y., assignor to Emhart Manufacturing Company, a corporation of Delaware Application November 16, 1949, Serial No. 127,718

12 Claims. (Cl. 154—42)

The present invention relates to the heat sealing of thermoplastic materials and more particularly to novel apparatus for producing superior heat seals with polyethylene and similar materials which heretofore have been difficult to seal.

A variety of heat sealing methods and equipment have been suggested and disclosed. One proposal has been to seal by pressing and removing layers of film from between constantly heated sealing elements. A disadvantage of this method is that the seal tends to separate, particularly at folds and the layers tend to stick to the heated sealing elements, thereby producing imperfections in the seal especially where stretched or oriented film is being sealed.

In an effort to avoid these and other disadvantages, it has been suggested that the sealing pressure be maintained through a predetermined period of heating and subsequent predetermined period of cooling until the weld or seal consolidates. A disadvantage of this method is that variations in ambient temperature, thickness of film and other factors make predetermined time periods of heating and cooling unreliable for securing an optimum heat sealing temperature and an optimum cooling temperature in successive or cyclic sealing operations. A timer permits variations in heating and cooling temperature which the present invention avoids.

In addition to eliminating difficulties heretofore experienced in heat sealing thermoplastic materials it, therefore, is an object of this invention to provide an improved heat sealing method and apparatus which assures heating to a predetermined optimum sealing temperature and cooling to a predetermined optimum setting temperature during and prior to release of sealing pressure.

A further object is to provide heat sealing apparatus in which expansion and contraction of the heat sealing element produced by heating and cooling of the element determines the amount of heating and cooling effected while sealing pressure is maintained on the sheets or other forms of thermoplastic material being sealed between the pressure elements.

Another object is to provide heat sealing apparatus of the type described in which one or more of the heating elements is a pressure element as well as thermostatic control element.

Still another object is to provide a device of the type described having an automatic cyclic operation and which includes means for preventing inadvertent recycling of the same seal.

The invention also contemplates providing heat sealing apparatus which is simple in construction and readily adjustable for operating under preselected temperature conditions and which is invariable in its temperature limits for a particular adjustment regardless of ambient temperature or other variants or changes.

Other objects and advantages will be apparent from the following description of the invention which is made with reference to the accompanying drawings, in which:

Fig. 2 is a side elevational view taken from the far end of the apparatus shown in Fig. 1 in which portions of the case or housing are broken away to show elements of pressure applying mechanism in their open positions;

Fig. 3 is a side elevational view taken from the back of Fig. 2 showing the pressure applying mechanism in closed position.

Figure 1:
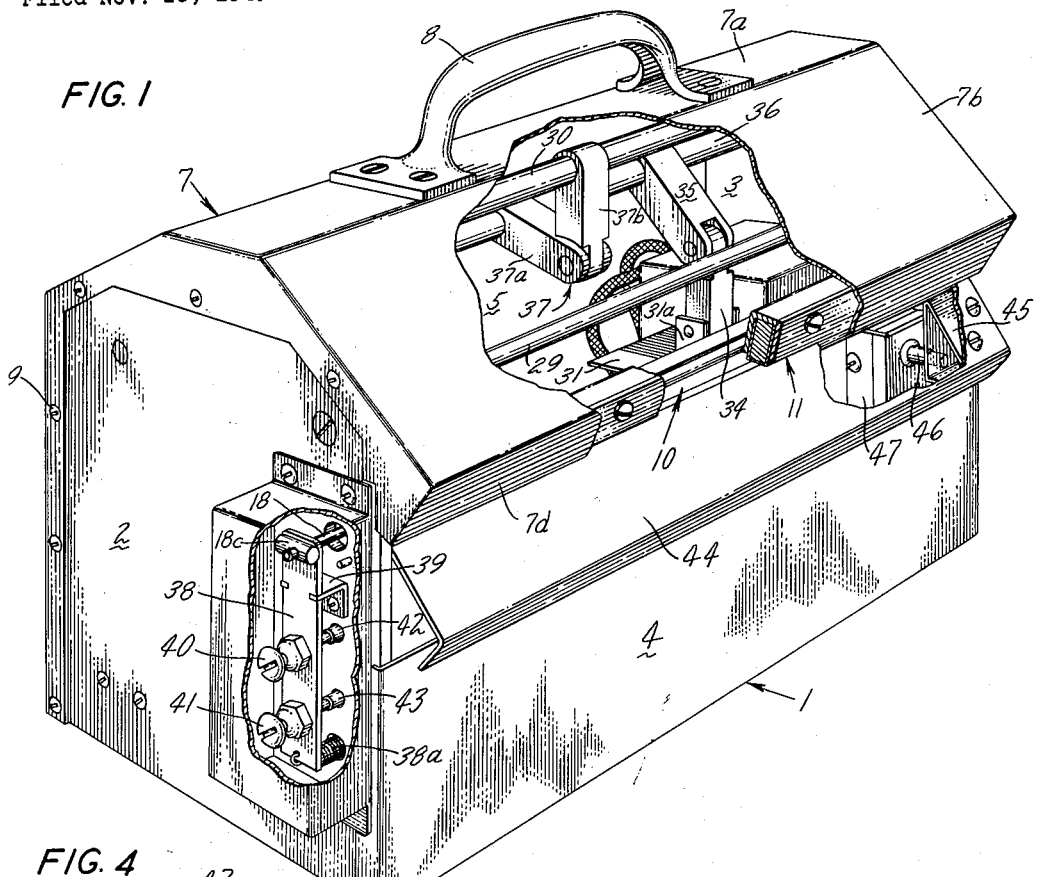
Figure 1 is a perspective view partially broken away of heat sealing apparatus embodying the invention.

Referring to the drawings, mechanism embodying the present invention is shown enclosed within a housing generally designated by the numeral 1 which includes vertical side or end frame members 2 and 3, front and rear vertical panels 4 and 5, horizontal bottom or base members 6 (Fig. 3), and a top or cover 7 having an upper horizontally disposed portion 7a and downwardly and outwardly sloping front and rear portions 7b and 7c, respectively.

The illustrated heat sealing apparatus is a small portable device provided with a handle 8 for conveniently moving and carrying the unit.

Although not shown in detail in the drawings, it will be understood that the several components of the housing 1 are secured together as by means of screws 9 to permit ready assembly and disassembly and easy access to the operating mechanism housed therein.

The front sloping top panel 7b is bent inwardly and downwardly to provide a sloping shield portion 7d which projects outwardly from the front panel 4 and overlies an opening therebetween which extends substantially the width of the housing and provides a passage through which thermoplastic sheet material may be introduced into the housing for heat sealing between clamping jaws generally designated 10 and 11.

Referring more particularly to Figs. 1 and 2, clamping jaw 10 comprises a length of angle-iron 12 which extends transversely of the housing and is rigidly secured at its ends to the vertical frame members 2 and 3 as by means of brackets 13 and screws 14. Secured to an outer face or surface 12a of the jaw member 12, as by means of angle-iron members 15 and 16 and screws 15a and 16a, is an insulating pad 17 which may be rubber or other resilient material resistant to heat deterioration and which provides a resilient and electrically insulating backing for a heating element 18 over which a Teflon sheet or covering 19 is secured by the members 15 and 16.

Referring more particularly to the heating element 18, it is an elongated tubular member formed of a material such as Nichrome having a high resistance to flow of electrical energy. The ends of the element 18 extend in non-contacting relation through apertures in the side frame members 2 and 3 with one end rigidly secured relative to frame member 3 as by plate 20 which is electrically insulated from the frame 3 to which it is secured by screw 21. A second screw 22, which is insulated from and extends through the frame member 3, provides through its contact with plate 20 an electrical terminal 18a (Fig. 4) for the rigidly secured end of the heating element 18.

The movable jaw 11, which is movable into and out of clamping engagement with the fixed jaw 10, includes a length 23 of rubber or other resilient material which is the same length as the jaw 10 and which is of rectangular cross-section. Surface 23a of the rubber member 23 also is covered by a Teflon sheet 24, which together with member 23 is secured by a plate 25 and screws 26 to an angle-iron support 27 carried at the ends of a pair of lever members 28 which are pivotally supported at their centers on a horizontally disposed rod 29, the ends of which are secured to the frame members 2 and 3. A pressure bar 30 extends between and is rigidly secured to the co-extending ends of the levers 28 remote from the support 27 of jaw 11. It will be seen that pressure applied upwardly against pressure bar 30 pivots the levers 28 and moves the Teflon covered surface 23a of the movable jaw 11 into the clamping position with respect to the Teflon covered heating and pressure exerting element 18 of the stationary jaw member 10 as shown in phantom in Fig. 2.

Referring now to the means for applying the pressure to move the jaw 11 into and out of its clamping position, there is provided an actuating solenoid 31 which is suitably secured to the bottom frame members 6, as by screws 32 and spacers 33, with the movable plunger 31a of the solenoid vertically disposed so that when the coil of the solenoid is not energized the plunger will drop of its own weight to the lower or de-energized position of the solenoid and the open position of the jaws 10 and 11 (Figs. 1 and 2) from its upper or energized position (Fig. 3) at which it holds the jaws in their closed or clamping position.

In order to transmit the motion of the solenoid plunger 31a to the jaw 11, the upper end of the plunger pivotally carries the lower end of a link 34, the upper end of which is pivotally secured to a crank 35 fastened to a jack shaft 36 rotatably supported in the end members 2 and 3. Also secured to the jack shaft 36 is a crank 37a which together with a link 37b pivotally secured at its ends to crank 37a and pressure bar 30 provide a toggle 37 that exerts the necessary clamping pressure on the bar 30 when the solenoid is energized.

In accordance with the present invention, provision is made for heating the element 18 and for adjustably preselecting the temperatures to which the element 18 is heated and cooled, as well as for automatically closing the jaws 10 and 11 when heating of the element 18 is initiated and for simultaneously opening the jaws when the element has cooled to the preselected lower temperature.

More particularly, the free end of the heating element 18 passes through the upper end of a vertically disposed multiplying lever 38 which is fulcrumed adjacent its upper end on the outer edge of a bracket 39 fastened to the side frame 2. The lever 38 is secured on its fulcrum by means of a tension spring 38a, the ends of which are secured to a fixed bracket (not shown) mounted on the inner wall of frame 3 and to the lower end of the lever, and by means of a stop 18c which is adjustably mounted on the free end of heating element 18 and against which the upper end of the lever 38 is forced by the spring 38a.

The lever 38 and fulcrum 39 preferably are formed of brass or other conductor of electrical energy so that a screw or other fastener which secures the fulcrum to the frame wall 2 may also serve as a terminal 18b (Fig. 4) for the heating element 18.

It will be understood that the Nichrome tubular heating element 18 will expand and contract in length responsively to the increases and decreases in its temperature. Inasmuch as one end of the tube 18 is securely fastened relative to the frame member 3, movement of the free end produced by heating and cooling of the tubular element 18 will result in a corresponding movement of the lever 38.

Mounted in the lever 38 below the fulcrum 39, so that their movement is a multiple of the movement of the free end of the heating element 18, are adjustment screws 40 and 41 which project inwardly toward and in directions normal to the frame wall 2. The positions of the screws 40 and 41 may be adjusted so that their inner ends engage and close respective micro-switches 42 and 43 when the screws 40 and 41 move inwardly to preselected positions corresponding to predetermined length and temperature of the element 18 and which disengage and permit the micro-switches to automatically assume their normal or open positions when the screws move outwardly from their preselected positions in response to cooling and contraction of the element 18.

Heating of the element 18 and closing of the jaws 10 and 11 are simultaneously initiated by manual pressure applied to a pressure plate 44 which is pivotally supported by the end frame members 2 and 3 and which swings inwardly from its normal downwardly and outwardly sloping position when pressure is exerted, the pressure being transmitted through a bracket 45 carried by the plate 44 onto a button 46 which closes a normally open micro-switch 47 (Figs. 1 and 2).

Figure 4:
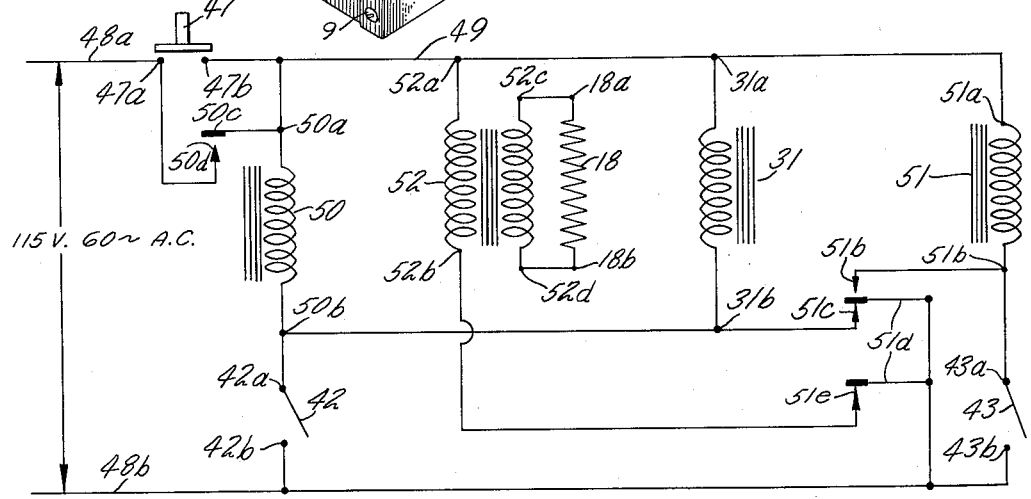
Fig. 4 is a wiring diagram of the heat sealing apparatus shown in Figs. 1–3.

Referring more particularly to the wiring diagram shown in Fig. 4 for the sealer thus far described, one terminal 47a of the micro-switch 47 is connected to a line 48a of a two-wire power source 48a, 48b, which may be, for example, 115 volt, 60 cycle A. C. Terminal 47b of micro-switch 47 is connected by line 49 with terminals 50a and 51a of a pair of coil relays 50 and 51 and with terminal 31a of the clamping solenoid 31 as well as with primary terminal 52a of a transformer 52, the secondary terminals 52c and 52d of which are respectively connected to the terminals 18a and 18b of the heating element 18.

The relay terminal 50a is connected to a contact 50c of a pair of normally open switch contacts 50c and 50d which are closed when the relay 50 is energized. As shown in Fig. 4, the switch contact 50d is connected to the terminal 47a of the starting micro-switch 47. Terminals 50b and 31b of the relay 50 and solenoid 31 are commonly connected to terminal 42a of the normally open micro-switch 42 and with terminal 51c of a three terminal switch 51b, 51c and 51d controlled by the relay 51. The primary terminal 52b of the transformer 52 is connected to terminal 51e of normally closed switch 51d, 51e, controlled by relay 51. The switch and relay terminal 51b is connected to terminal 43a of microswitch 43, terminal 43b of which together with the movable contact or terminal 51d of the relay 51, and with terminal 42b of micro-switch 42, are connected to the power line 48b.

The operation of the heat sealer will now be explained:

The operator places sheets of thermoplastic material which are to be heat sealed between the open jaws 10 and 11 and manually depresses the pressure plate 44, thereby actuating the button 46 and closing the normally open terminals 47a, 47b of the micro-switch 47. Thereupon relay 50 is energized, the current flowing 48a, 47a, 47b, 50a, 50b, 51c, 51d and 48b. Energization of the relay 50 closes the normally open relay switch terminals 50c, 50d, thereby shunting the micro-switch 47 and assuring the uninterrupted completion of the sealing cycle hereinafter described even though closing pressure is only momentarily applied to micro-switch 47 by the manual pressure on plate 44. Clamping solenoid 31 being connected in parallel with relay 50 is simultaneously energized and solenoid plunger moves upward to the position shown in Fig. 3 thereby closing and clamping the jaws 10 and 11 on the thermoplastic sheets, as shown in phantom in Fig. 2.

Concurrently the primary of transformer 52 is energized through circuit 48a, 47a, 50d, 50c, 50a, 49, 52a, 52b, 51e, 51d and 48b, the relay switch 51e—51d being always closed when relay 51 is not energized. Thereupon the Nichrome heating element 18 is electrically heated by current from the secondary of transformer 52, the flow of current being 52c, 18a, 18b and 52d. The heating element 18 expands in length as its temperature increases and corresponding movement of the multiplying lever 38 (Figs. 1 and 3) is increased. The screw 40 on the lever 38 has previously been adjusted so that it holds the normally open micro-switch 42 closed when the temperature of the heating element 18 and the corresponding length of the element and position of the lever 38 is at or above the preselected optimum temperature at which the pressure exerted on the sheets S by the jaws 10 and 11 may be relieved without producing or permitting failure of a heat seal formed therebetween. Similarly, screw 41 on the lever 38 is adjusted so that the normally open switch 43 is moved to the closed position when the heating element 18 extends to a length corresponding to a preselected optimum temperature at which to heat seal the thermoplastic sheets S.

As the heating of the element 18 and its temperature rises, the resulting extension of the element and corresponding movement of the lever 38 cause the screw 40 to close the micro-switch 42 but has no appreciable effect on any circuit as the closed switch 42 merely parallels the closed switch 51d, 51e of the unenergized relay 51. However, at the higher or optimum heat sealing temperature, the screw 41 closes the open switch 43 thereby energizing relay 51 whereupon contacts 51d and 51e are instantaneously opened and simultaneously contact 51d is moved out of engagement with contact 51c and into engagement with contact or terminal 51b. The opening of contacts 51d and 51e breaks the flow of current through the transformer 52 and heating of the element 18 is discontinued at the preselected optimum heat sealing temperature. The element 18 promptly begins to cool and contract in length whereupon screw 41 disengages from switch 43 and switch contacts 43a, 43b open. However, current continues to flow through the closed switch terminals 51b and 51d thus keeping relay 51 energized and said terminal or contact members in engagement. At the same time, although contacts 51c and 51d are disengaged, current continues to be supplied to the clamping solenoid through the closed microswitch 42 during further cooling of the element 18 and the sheets S remain clamped between the jaws 10 and 11.

When the element 18 cools below the preselected lower temperature at which the sheet S may be released by the pressure of clamping jaws 10 and 11, screw 40 disengages and permits the microswitch 42 to automatically assume its normal, open position thereby de-energizing the solenoid whereupon solenoid plunger 31a drops of its own weight to its lower position (Figs. 1 and 2) and the jaws 10 and 11 are opened for the removal of the heat sealed sheets S. Concurrently, relay 50 is de-energized, thereby opening contacts 50c, 50d and de-energizing relay 51 whereupon the cycle for the device is completed and the switches are in their positions shown in Fig. 4 and ready for a reptition of the cycle.

The above described cycle assumes that the operator does not continue the cycle initiating pressure on the pressure plate 44 and keeps the switch closed after the cycle is initiated. However, even though switch 47 is kept closed the cycle is the same except that opening of the microswitch 42 and de-energization of relay 50 does not de-energize relay 51 and therefore prevents automatic recycling. It wil be seen that if switch 47 continues to connect solenoid terminal 51a with power line 48a the cycle cannot be repeated until contact 51d disengages 51b and engages 51c and that this requires de-energizing solenoid 51 which only can be effected by opening switch contacts 47a, 47b and 50c, 50d.

It will be seen that the illustrated embodiment of the invention heretofore described provides a heat sealing cycle in which the upper temperature cannot exceed a preselected optimum regardless of time or ambient temperature and in which the sealed material is not released until a preselected lower temperature is established in the heating element regardless of elapsed time or variations in the rate of cooling.

In connection with the cooling, it will be understood that the rate may be accelerated or decelerated by passing a fluid through the tubular heating element 18 or otherwise regulating its cooling internally.

The relay switch 50 may be replaced by a limit switch (not shown) which is spring biased to its normal or open position and is closed only when the jaw 11 is moved to its fully closed position with respect to jaw 10. Such a substitution prevents the heretofore described heating and clamping cycle from "locking-in" should the jaws 10 and 11 be held apart by a finger or other large foreign object which may have been accidently introduced between the jaws.

It will be appreciated that the present device is advantageous in its use of element 18 as both a heater and as a thermostatic control member.

The disposition of the pressure face 23a of the movable jaw 11 and the cooperating portion of the stationary jaw 10 at approximately 45° to the horizontal facilitates the removal of the seal from the jaws and minimizes any tendency for the sheets S to stick to the clamping jaws 10 and 11.

The tendency to stick, particularly to the heating element 18, is further minimized by the expansion and contraction of the element and by the Teflon coverings 19 and 24 which are interposed between the thermoplastic sheets S and the clamping surfaces of the jaws.

The expansion and contraction of the heating element 18 during the pressure exerting portion of the sealing cycle has the further advantage of "ironing-in" the seal which is effected.

Heat sealing effected by means of the present invention is particularly successful with polyethylene and other thermoplastic which heretofore have proved especially difficult to seal.

The present invention may be employed in association with feeding, filling, packaging and folding equipment but such equipment forms in part the present invention.

From the foregoing description and the accompanying drawings, it will be seen that the present invention provides an improved construction for sealing machines for bags or the like in which the bag or article to be sealed can be held in the operator's hands and he will still be able to conveniently and safely operate the machine. With the improved construction provided, the sealing of bags or other operations to be performed can be rapidly and economically carried out in a safe and easy manner by relatively unskilled persons.

I claim:

1. A machine for heat sealing layers of thermoplastic material including a pair of cooperating pressure members mounted for movement relative to each other into and out of pressing engagement with said layers, a heating element associated with at least one of said pressure members, means for energizing said element and heating it to a preselected temperature, temperature actuated thermostatic means responsive to the temperature of the heating element for discontinuing said energization only at a preselected temperature while said pressure is maintained, and automatic means responsive to said thermostatic means for relieving the sealing pressure exerted by said members only when said heating element element has cooled to a preselected lesser temperature.

2. A machine for heat sealing layers of thermoplastic material including a pair of cooperating pressure members mounted for movement relative to each other into and out of pressing engagement with said layers, an expansible heating element mounted on at least one of said pressure members in pressing relationship to said layers, means operative when the pressure members are exerting sealing pressure for energizing the heating element and expanding it to a predetermined length corresponding to a preselected temperature of said element, operable means actuated by said element for discontinuing said energization when said predetermined length is attained and while said pressure is maintained, and automatic means actuated by said element for relieving the sealing pressure exerted by said members when the heating element has cooled and contracted to a predetermined lesser length corresponding to a preselected lesser temperature of said element.

3. A machine for heat sealing layers of thermoplastic material including a pair of cooperating pressure jaws mounted for movement into and out of pressing relationship to each other and to the layers of material to be sealed, a solenoid energizable to force said jaws into sealing position and de-energizable to open said jaws, a heating element mounted on one of said jaws and movable therewith into pressing relationship to said material, said element being secured at one end relative to the jaw on which it is mounted and the remainder of the element being free to move relative to said jaw as the element expands and contracts with changes in its temperature, means for heating said element, means for initiating heating of said element by said heating means and for simultaneously energizing said solenoid, means for maintaining energization of said solenoid and heating of said element following initiation of those actions, means actuated by said element responsive to changes in length of said element for discontinuing said heating at a predetermined length of said element corresponding to a preselected temperature thereof while maintaining said solenoid energized, said responsive means including means for de-energizing said solenoid when the heating element cools to a lesser predetermined length corresponding to a lesser preselected temperature.

4 A machine for heat sealing layers of thermoplastic material including a pair of cooperating pressure jaws mounted for movement into and out of pressing relationship to each other and to the layers of material to be sealed, a solenoid having a vertically disposed reciprocating member movable in an upward direction to force said jaws into sealing position when said solenoid is energized and movable downward of its own weight to open said jaws when said solenoid is de-energized, a heating element mounted on one of said jaws and movable therewith into pressing relationship to said material, said element being secured at one end relative to the jaw on which it is mounted and the remainder of the element being free to move relative to said jaw as the element expands and contracts with changes in its temperature, a transformer for supplying heating current to said element, a manually operable switch for initiating heating of said element by current from said transformer and for simultaneously energizing said solenoid, a relay for maintaining energization of said solenoid and heating of said element following said initial heating and energization, a switch actuated by sad element responsive to changes in length of said element for discontinuing said heating at a predetermined length of said element corresponding to a preselected temperature thereof while maintaining said solenoid energized, and a second switch actuated by said element responsive to elongation and contraction of said element for de-energizing said solenoid when the heating element cools to a lesser predetermined length corresponding to a lesser preselected temperature.

5. Apparatus as recited in claim 4 and including a second relay which prevents recycling of the apparatus prior to manual reactivation of said initiating switch.

6. Apparatus as recited in claim 4 and wherein the two switches responsive to change in length of said element are carried by a lever which is movable in response to changes in the length of the heating elements and are adjustable to preselect the temperatures of the element at which heating is discontinued and the solenoid is de-energized.

7. A machine for heat sealing thermoplastic layers comprising in combination a pair of cooperating pressure jaws mounted for relative movement into and out of clamping engagement, a directly heatable heater element mounted on the pressure surface of one of said jaws, means for displacing said jaws into a closed position to apply pressure to the layers to be heat sealed, and means effective upon movement of said jaws to the closed position for electrically energizing said heater element to heat said element and said layers to heat sealing temperatures, means actuated by said element responsive to expansion and contraction of said element for de-energizing said element when it expands to a particular size and for opening said jaws when said element contracts to a particular lesser size.

8. A machine for heat sealing layers of thermoplastic material including means movable between pressure exerting and relieving positions for exerting sealing pressure on said layers, a hollow tubular heating element associated with said pressure means in juxtaposition to said layers, means to heat said tubular element to a preselected sealing temperature only, and thermally operated means responsive to the temperature of said element for actuating said pressure exerting means when said element is at a preselected temperature to move said pressure exerting means to the pressure relieving position.

9. In apparatus for sealing plastics, means for pressing plastic material into preselected position for sealing, heating means operable to heat said plastic material, operable means thermostatically actuated responsive to the temperature of said heating means for discontinuing operation of said heating means at a preselected temperature, and automatic means for relieving said pressing means when said heating means cools to a preselected lesser temperature.

10. A device for heat sealing thermoplastic films comprising an insulative base, a metal tube arranged for being heated by the passage of an electric current in the wall thereof and for being cooled by a coolant fluid in the inner space thereof, and mounting means for holding said tube on said base against displacement in directions transverse to its axis while permitting limited displacement thereof in the direction of its axis under the effect of heat expansion.

11. A machine for heat sealing thermoplastic sheets comprising, in combination, a sealing member and a pressure member, said sealing member comprising a layer of electrically conducting material having a first surface constituting a sealing face and a second surface separated from the said first surface by the thickness of said layer, means for producing a pulse of electrical current in the said layer of the sealing member to heat the said first surface thereof to heat sealing temperatures, means for passing a flow of coolant fluid in direct contact and in intimate heat exchange relation with the said second surface to withdraw heat from the said layer of the sealing member, and means for causing relative reciprocation of said sealing and pressure members.

12. A machine for heat sealing thermoplastic sheet material, and the like, comprising, in combination, a sealing member and a pressure member, said sealing member comprising a metal tube arranged for being intermittently heated to heat sealing temperatures by the flow of pulses of electrical current in the wall thereof and for being continuously cooled by the flow of a coolant fluid through the inner space thereof, and means for causing relative reciprocation of said sealing and pressure members.

References Cited in the file of this patent

UNITED STATES PATENTS

| | | |
|---|---|---|
| 2,103,945 | Henley | Dec. 28, 1937 |
| 2,227,497 | Hallman | Jan. 7, 1941 |
| 2,376,253 | Humphrey | May 15, 1945 |
| 2,390,550 | Moore | Dec. 11, 1945 |
| 2,393,100 | Gallay | Jan. 15, 1946 |
| 2,402,631 | Hull | June 25, 1946 |
| 2,460,460 | Langer | Feb. 1, 1949 |
| 2,509,439 | Langer | May 30, 1950 |